United States Patent
Toda

(10) Patent No.: US 9,621,766 B2
(45) Date of Patent: Apr. 11, 2017

(54) IMAGE PROCESSING APPARATUS, IMAGE PROCESSING METHOD, AND PROGRAM CAPABLE OF PERFORMING HIGH QUALITY MIST/FOG CORRECTION

(71) Applicant: NEC Corporation, Minato-ku, Tokyo (JP)

(72) Inventor: Masato Toda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/441,219

(22) PCT Filed: Oct. 30, 2013

(86) PCT No.: PCT/JP2013/079379
§ 371 (c)(1),
(2) Date: May 7, 2015

(87) PCT Pub. No.: WO2014/077126
PCT Pub. Date: May 22, 2014

(65) Prior Publication Data
US 2015/0304524 A1    Oct. 22, 2015

(30) Foreign Application Priority Data
Nov. 13, 2012    (JP) ................. 2012-249458

(51) Int. Cl.
*G06K 9/00*    (2006.01)
*H04N 1/60*    (2006.01)
(Continued)

(52) U.S. Cl.
CPC ........... *H04N 1/6027* (2013.01); *G06T 5/001* (2013.01); *H04N 1/407* (2013.01); *H04N 1/58* (2013.01); *G06T 2207/10024* (2013.01)

(58) Field of Classification Search
CPC .......... G06T 2207/10024; G06T 5/003; G06T 5/009; G06T 5/00; G06T 5/001;
(Continued)

(56) References Cited

U.S. PATENT DOCUMENTS

2007/0120997 A1*    5/2007    Sasaki ................ H04N 5/23248
                                                          348/362
2010/0118186 A1    5/2010    Sakagami
(Continued)

FOREIGN PATENT DOCUMENTS

| CN | 101682788 A | 3/2010 |
|---|---|---|
| JP | 02-078000 A | 3/1990 |

(Continued)

OTHER PUBLICATIONS

International Search Report for PCT Application No. PCT/JP2013/079379, mailed on Dec. 10, 2013.
(Continued)

*Primary Examiner* — Li Liu

(57) ABSTRACT

The present invention provides an image processing apparatus including a skeleton component separation unit configured to separate a skeleton component illustrating a perspective structure from a source image, a mist/fog correction unit configured to calculate, based on color information in each color channel of the skeleton component, a correction factor that lowers brightness of a pixel as the pixel is brighter and correct, based on the correction factor, brightness of each pixel of the source image, and a brightness restoration unit configured to restore brightness of the brightness-corrected source image to brightness of environmental light as target brightness.

15 Claims, 7 Drawing Sheets

(51) Int. Cl.
*G06T 5/00* (2006.01)
*H04N 1/407* (2006.01)
*H04N 1/58* (2006.01)

(58) Field of Classification Search
CPC .......... G06T 5/002; G06T 2207/20182; G06T 2207/20192; H04N 1/6027; H04N 1/407; H04N 1/409; H04N 1/58; G06K 9/40
See application file for complete search history.

(56) References Cited

U.S. PATENT DOCUMENTS

| | | | |
|---|---|---|---|
| 2010/0259651 A1* | 10/2010 | Fattal | G06T 5/003 348/241 |
| 2011/0135200 A1* | 6/2011 | Chen | G06T 5/003 382/167 |
| 2011/0157383 A1 | 6/2011 | Jang | |
| 2011/0188775 A1* | 8/2011 | Sun | G06K 9/40 382/274 |
| 2011/0211758 A1 | 9/2011 | Joshi et al. | |
| 2012/0212477 A1* | 8/2012 | Grindstaff | G06T 5/003 345/419 |
| 2013/0071043 A1* | 3/2013 | Bai | G06T 5/003 382/255 |
| 2014/0072216 A1* | 3/2014 | Fang | G06T 5/009 382/167 |
| 2014/0140619 A1* | 5/2014 | Mukhopadhyay | G06T 5/40 382/167 |
| 2014/0205192 A1* | 7/2014 | Wang | G06T 5/00 382/167 |

FOREIGN PATENT DOCUMENTS

| | | |
|---|---|---|
| JP | 2010-062911 A | 3/2010 |
| JP | 2011-003048 A | 1/2011 |
| JP | 2011-113346 A | 6/2011 |
| JP | 2012-033084 A | 2/2012 |
| JP | 2012-164367 A | 8/2012 |
| WO | 2012/127904 A1 | 9/2012 |

OTHER PUBLICATIONS

Kaiming He, Jian Sun, and Xiaou Tang, "Single Image Haze Removal Using Dark Channel Prior". IEEE Conference on Computer Vision and Pattern Recognition (CVPR), 2009.
Raanan Fattal, "Single Image De hazing". ACM SIGGRAPH 2008, 2008.
Bin Xie et al., "Universal strategy for surveillance video defogging", Optical engineering, Soc. of Photo-Optical Instrumentation Engineers, Bellingham, vol. 51, No. 10, Oct. 1, 2012, p. 101703, XP060025273, ISSM:0091-3286, DOI: 10.1117/1.OE.51.10.10703.
Haoran Xu et al., "Fast Image Dehazing Using Improved Dark Channel Prior", Information Science and Technology, 2012 International Conference on IEEE, Mar. 23, 2012, pp. 663-667, XP032194003, DOI: 10.1109/ICIST.2012.6221729, ISBN: 978-1-4577-0343-0.
Antonin Chanbolle, "An Algorithm for Total Variation Minimization and Applications", Journal of Mathmatical Imaging and Vision, Kluwer Academic Publishers, BO, vol. 20, No. 1-2, Jan. 1, 2004, pp. 89-97, XP019209067, ISSN: 1573-7683, DOI: 10.1023/B:JMIV. 0000011321.19549.88.
Extended European Search Report for EP Application No. EP13855298.9 dated Jun. 16, 2016.
Chinese Office Action for CN Application No. 201380059158X dated on Sep. 27, 2016 with English Translation.

\* cited by examiner

FIG.6
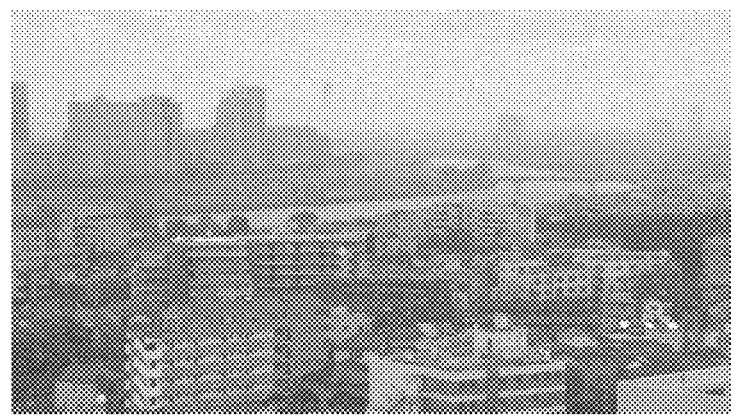
SOURCE IMAGE (INPUT IMAGE)
OUTPUT IMAGE

IMAGE PROCESSING APPARATUS, IMAGE
PROCESSING METHOD, AND PROGRAM
CAPABLE OF PERFORMING HIGH
QUALITY MIST/FOG CORRECTION

This application is a National Stage Entry of PCT/JP2013/079379 filed on Oct. 30, 2013, which claims priority from Japanese Patent Application 2012-249458 filed on Nov. 13, 2012, the contents of all of which are incorporated herein by reference, in their entirety.

TECHNICAL FIELD

The present invention relates to an image processing apparatus, an image processing method, and a program.

BACKGROUND ART

Under circumstances where mist/fog exists, as it is illustrated in FIG. 8, reflection light from an object to be captured is attenuated due to a scattering of particles of mist/fog while routing from the object to a camera sensor. At the same time, environment light is also scattered by the particles of mist/fog and thus scattered environment light also reaches the camera sensor. Therefore, the light applied to the camera sensor becomes mixed light of the attenuated reflection light from the object and the scattered environmental light. Observation light $I(x, \lambda)$ having a wavelength $\lambda$ at a pixel location x is expressed by an equation (1) by using reflection light $J(x, \lambda)$ and the environmental light $A(\lambda)$ at the pixel location x. Here, $t(x, \lambda)$ indicates transmittance of the reflection light. The transmittance of the reflection light is expressed by an equation (2) by using a diffusion coefficient k per unit distance and a distance d to the object in a case where a condition of the environmental atmospheric air is uniform.

$$I(x,\lambda)=t(x,\lambda)\cdot J(x,\lambda)+(1-t(x,\lambda))\cdot A(\lambda) \quad (1)$$

$$t(x,\lambda)=\exp(-k(\lambda)\cdot d(x)) \quad (2)$$

In a visible light wavelength region, the scattering of light caused by particles of mist/fog is considered as being the same independent from a wavelength of the light. Thus, the observation light $I(x, \lambda)$ can be expressed by an equation (3).

$$I(x,\lambda)=t(x)\cdot J(x,\lambda)+(1-t(x))\cdot A(\lambda)t(x)=\exp(-k\cdot d(x)) \quad (3)$$

In a video image restoration technique under a condition where mist/fog exists, unattenuated reflection light $J(x, \lambda)$ from the object is estimated from the observation light $I(x, \lambda)$ to output an image. More specifically, by estimating a transmittance $t(x)$ of the reflection light, the reflection light $J(x, \lambda)$ is calculated using an equation (4).

$$J(x, \lambda) = \frac{1}{t(x)}I(x, \lambda) - \frac{1-t(x)}{t(x)}A(\lambda) \quad (4)$$

In the above described estimation and restoration, 2 pieces of information such as the reflection light $J(x, \lambda)$ and the transmittance $t(x)$ are required to be estimated for each pixel from the observation light $I(x, \lambda)$, so that the equation results in being an ill-posed problem where no solution can be found. Consequently, it is required that optimum solutions of the reflection light $J(x, \lambda)$ and the transmittance $t(x)$ should be estimated based on preliminary provided knowledge about the environment.

A certain number of techniques in which the reflection light and the transmittance are estimated for removal of mist/fog are proposed to date. Among them, a method for performing correction processing with respect to a piece of image as an input is described below with reference to non-patent document 1 and non-patent document 2.

The non-patent document 1 discloses a technique in which a restoration image is generated based on a statically-obtained knowledge that a nature description image without mist/fog generally includes, around a target pixel, a pixel whose value is 0 in either one of a red (R) channel, a green (G) channel, and a blue (B) channel. Therefore, if a pixel whose value is 0 does not exist around a target pixel, assuming that such situation is a result of an effect of superimposition of environmental light due to mist/fog, transmittance is calculated based on an amount of the superimposition.

Further, the non-patent document 2 discloses a method for separating reflection light and environmental light from each other focusing upon uncorrelation between a distance to a texture of an object and a distance to the object (i.e., a degree of superimposition of environmental light due to mist).

CITATION LIST

Non-Patent Literature

[Non-Patent Document 1] Kaiming He, Jian Sun, and Xiaou Tang, Single Image Haze Removal Using Dark Channel Prior. IEEE Conference on Computer Vision and Pattern Recognition (CVPR), 2009

[Non-Patent Document 2] Raanan Fattal, Single Image Dehazing. ACM SIGGRAPH 2008, 2008.

SUMMARY OF INVENTION

Solution to Problem

However, the technique of the non-patent document 1 includes such a problem to be solved that an excessive correction is made on a region where the above described condition is not satisfied (e.g., regions of sky and white buildings).

The technique of the non-patent document 2 is expected to theoretically generate a high-quality image; however, as a result of a simulation, obtained in a region widely occupied by superimposition of a light source component due to mist was a low quality output. This is because different information between color bands is used as information suggesting a texture of an object. More specifically, in the region widely occupied by the superimposition of the light source component due to mist, such region is susceptible to be affected by a noise because of an extremely small differential value between color bands.

The present invention is made to provide an image processing apparatus capable of performing high quality mist/fog correction processing even in a case where a pixel whose value is 0 in either one of a red (R) channel, a green (G) channel, and a blue (B) channel does not exist around a target pixel and in a case where a different value between color bands is small, image processing method, and a program.

Means for Solving the Problems

The present invention is directed to an image processing apparatus including a skeleton component separation unit configured to separate a skeleton component illustrating a perspective structure from a source image and a mist/fog correction unit configured to calculate a correction factor based on color information in each color channel of the skeleton component and correct, based on the correction factor, brightness of each pixel of the source image.

The present invention is directed to an image processing method including separation processing configured to separate a skeleton component illustrating a perspective structure from a source image and mist/fog correction processing configured to calculate a correction factor based on color information in each color channel of the skeleton component and correct, based on the correction factor, brightness of each pixel of the source image.

The present invention is directed to a program for causing a computer to execute separation processing configured to separate a skeleton component illustrating a perspective structure from a source image and mist/fog correction processing configured to calculate a correction factor based on color information in each color channel of the skeleton component and correct, based on the correction factor, brightness of each pixel of the source image.

Advantageous Effect of Invention

According to the present invention, high quality mist/fog correction processing is achieved even in a case where a pixel whose value is 0 in either one of a red (R) channel, a green (G) channel, and a blue (B) channel does not exist around a target pixel and in a case where a different value between color bands is small.

BRIEF DESCRIPTION OF DRAWINGS

FIG. 6 shows a source image (i.e., an input image) and an output image.

DESCRIPTION OF EMBODIMENTS

A first exemplary embodiment of the present invention is described below.

Figure 1:
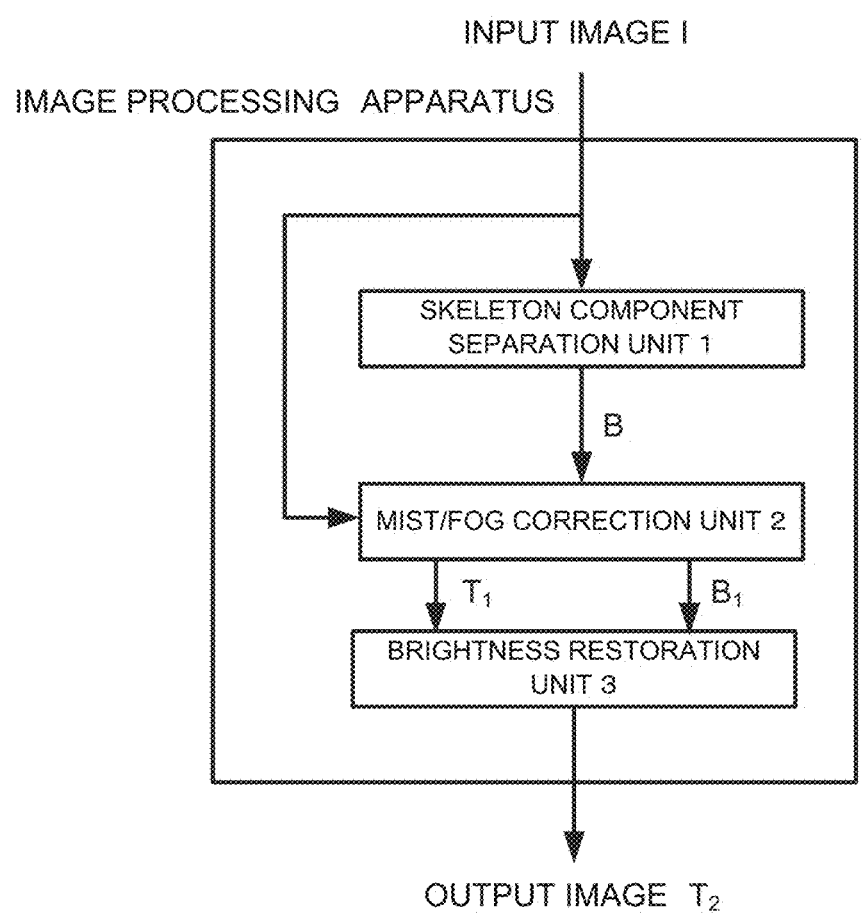
FIG. 1 is a block diagram illustrating an image processing apparatus according to a first exemplary embodiment.

FIG. 1 is a block diagram illustrating an image processing apparatus according to the first exemplary embodiment of the present invention.

The image processing apparatus according to the first exemplary embodiment includes a skeleton component separation unit 1, a mist/fog correction unit 2, and a brightness restoration unit 3.

The skeleton component separation unit 1 is configured to separate a skeleton component illustrating a perspective structure from a source image (i.e., an input image) input to the image processing apparatus. An example of the separation method includes a skeleton component/texture component separation method, using a total variation norm minimization, capable of extracting brightness and color information for each region. The total variation norm minimization is a technique for removing a vibration component within an image as a texture component or a noise component. More specifically, in the technique, a skeleton component of a source image (i.e., an input image) is extracted by removing a texture component or a noise component from the source image.

More specifically, by solving a minimization problem expressed by an equation (5), a skeleton component B of an image is extracted from a source image (hereinafter referred to as input image) I. In combination with a multi-resolution analysis, not only a removal of a fine vibration component but also a removal of a (low-frequency) vibration component having a wide cycle to some extent can be achieved. Here, subscript "2" in the equation (5) indicates L2-norm.

$$\min_{B}\left(\int |\nabla B| dx dy - \frac{\mu}{2}\|I - B\|_2^2\right) \quad (5)$$

The mist/fog correction unit 2 is configured to calculate, based on color information in each color channel of the skeleton component, a correction factor that lowers brightness of a pixel as the pixel becomes brighter and correct, based on the correction factor, brightness of each pixel of the input image and each pixel of the skeleton component to remove mist/fog. In a correction of the brightness, a gamma correction is locally performed to suppress a drastic fluctuation on a low brightness side of the input image, thereby preventing a black defect. More specifically, the mist/fog correction unit 2 is configured to calculate, from a minimum value of color channel of each pixel of the skeleton component, an amount of superimposition of mist/fog of the each pixel and calculate a gamma value (i.e., a correction factor) for correction of a pixel from the amount of superimposition of mist/fog to perform a gamma correction by using thus calculated gamma value with respect to the pixel. Incidentally, the gamma value (i.e., the correction factor) may be determined not only with color information in each color channel but also additionally with brightness surrounding the pixel to be corrected.

More specifically, the mist/fog correction unit 2 is configured to perform the gamma correction, with reference to the skeleton component B, while changing the gamma value for each pixel based on the color information of each pixel of the input image I. Further specifically, with respect to a pixel at a location x, a value obtained such that a minimum value of each color channel of the skeleton component B is multiplied by a ratio r is set to an amount of superimposition haze (0<haze<1) of mist/fog of the image (see, an equation (6)). Then, a gamma value $\gamma_h$ is set for the purpose of a correction by using an equation (7) and correction is performed based on the gamma value $\gamma_h$ according to an equation (8). Here, $T_1$ indicates an input image after removing mist/fog, x indicates a location of a pixel, and $\lambda$ indicates a color channel.

$$\text{haze} = r \cdot \min_{\forall \lambda}(B(x, \lambda)) \quad (6)$$

$$\gamma_h = \frac{1.0}{1.0 - \text{haze}} \quad (7)$$

$$T_1(x, \lambda) = (I(x, \lambda))^{\gamma_h} \quad (8)$$

The brightness restoration unit 3 is configured to restore brightness throughout an image whose brightness was lowered to brightness of environmental light of the image as target brightness with respect to the input image whose brightness was corrected. The mist/fog correction unit 2 will perform correction processing around a saturation point 1.0 in order to suppress information loss caused by saturation. Accordingly, brightness of the environmental light and brightness throughout the image tend to be dark. Now, thus lowered brightness throughout the image is restored by the brightness restoration unit 3. More specifically, the brightness restoration unit 3 is configured to calculate an index $\gamma_2$ for converting thus lowered brightness of the environmental light to target brightness and correct, by using the index $\gamma_2$, the entire image according to an equation (9).

$$T_2(x,\lambda)=1.0-(1.0-T_1(x,\lambda))^{\gamma_2} \qquad (9)$$

Here, $T_2$ indicates an input image whose brightness has been restored.

The index $\gamma_2$ can be calculated by the following equation:

$$\gamma_2=\ln(1.0-q)/\ln(1.0-p)$$

where a value of the environmental light after being subjected to mist correction processing is p and target brightness is q. Here, the value p may be a correction result obtained in white correction processing.

According to an aspect of the first exemplary embodiment, in the mist/fog correction processing for removing mist/fog from an image, a black defect can be prevented by suppressing a drastic fluctuation on the low brightness side of the input image. According to another aspect of the first exemplary embodiment, decrease in contrast can also be prevented.

A second exemplary embodiment of the present invention is described below.

Figure 2:
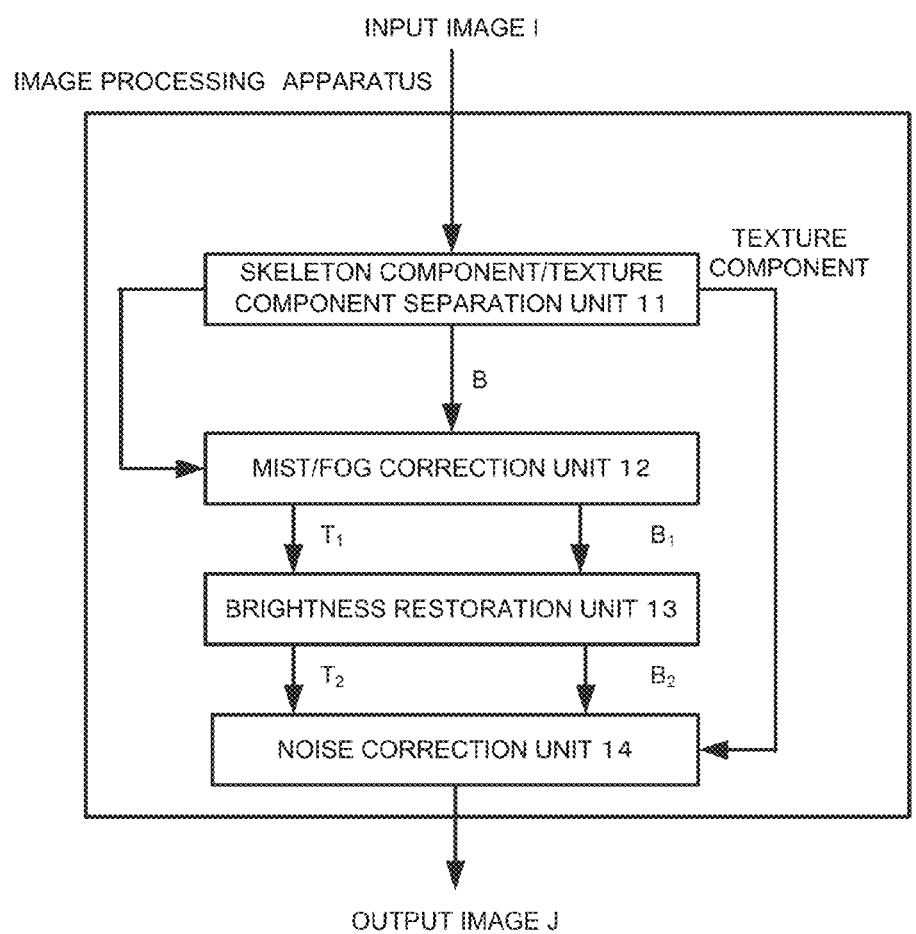
FIG. 2 is a block diagram illustrating an image processing apparatus according to a second exemplary embodiment.

FIG. 2 is a block diagram illustrating an image processing apparatus according to the second exemplary embodiment of the present invention.

The image processing apparatus of the second exemplary embodiment includes a skeleton component/texture component separation unit 11, a mist/fog correction unit 12, a brightness restoration unit 13, and a noise suppression unit 14.

The skeleton component/texture component separation unit 11 is configured to separate a source image (i.e., an input image) input to the image processing apparatus into a skeleton component illustrating a perspective structure and a texture component as a residual component of the source image. An example of the separation method includes a skeleton component/texture component separation method, using a total variation norm minimization, capable of extracting brightness and color information for each region. The total variation norm minimization is a technique for removing a vibration component within an image as a texture component or a noise component. In the technique, the removal of the texture component or the noise component enables extraction of a skeleton component of a source image (i.e., an input image). More specifically, the skeleton component B of the image is extracted according to the above described equation (1) and the skeleton component B is subtracted from the source image (hereinafter referred to as input image) I.

The mist/fog correction unit 12 is configured to calculate, based on color information in each color channel of the skeleton component, a correction factor that lowers brightness of a pixel as the pixel becomes brighter and correct, based on the correction factor, brightness of each pixel of the input image and each pixel of the skeleton component to remove mist/fog. In the brightness correction, execution of the local gamma correction suppresses a drastic fluctuation on a low brightness side of the input image to prevent a black defect. More specifically, the mist/fog correction unit 12 is configured to calculate, from a minimum value of color channel of each pixel of the skeleton component, an amount of superimposition of mist/fog of the each pixel and calculate, based on the amount of superimposition of mist/fog, a gamma value (i.e., a correction factor) for correcting the each pixel to perform a gamma correction by using thus calculated gamma value with respect to the each pixel. Incidentally, the gamma value (i.e., the correction factor) may be determined not only with color information in each color channel but also additionally with brightness surrounding the pixel to be corrected.

More specifically, a resulting input image $T_1$ is almost equivalent to the resulting input image of the mist/fog correction unit 2. The skeleton component B (x, $\lambda$) can be obtained in a similar manner by using equations (6)', (7)', and (8)' and an application of mist/fog removal, thereby obtaining $B_1(x, \lambda)$ $$\text{haze} = r \cdot \min_{\forall \lambda}(B(x,\lambda)) \qquad (6)'$$

$$\gamma_h = \frac{1.0}{1.0 - \text{haze}} \qquad (7)'$$

$$B_1(x,\lambda) = (B(x,\lambda))^{\gamma_h} \qquad (8)'$$

The brightness restoration unit 13 is configured to have a function similar to the function of the above described brightness restoration unit 3. The brightness restoration unit 13 is configured to restore not only brightness of the input image whose brightness was corrected but also, with respect to the skeleton component, brightness throughout an image whose brightness was lowered to brightness of environmental light of the image as target brightness. The brightness-restored input image $T_2$ is obtained in a similar manner by using the equation (9) and the brightness-restored skeleton component $B_2$ is expressed by an equation (9)'.

$$B_2(x,\lambda)=1.0-(1.0-B_1(x,\lambda))^{\gamma_2} \qquad (9)'$$

The noise suppression unit 14 is configured to suppress a noise of the texture component based on the brightness-restored input image, the brightness-restored skeleton component, and the texture component and generate an output image from the noise-suppressed texture component and the brightness-restored skeleton component. That is, the noise suppression unit 14 is configured to suppress a sharpened noise in an image. In the mist/fog correction processing, since a local contrast is sharpened, the noise as well as the texture component is sharpened in the image. The noise suppression unit 14 is configured to suppress the sharpened noise with respect to the input image $T_2$ and the skeleton component $B_2$. More specifically, a brightness enhancement ratio t of texture and noise is calculated according to an equation (10) by using the skeleton component $B_2$ having been subjected to correction processing similarly in the input image.

$$t(x,\lambda) = \frac{T_2(x,\lambda) - B_2(x,\lambda)}{I(x,\lambda) - B(x,\lambda)} = \frac{sub_2(x,\lambda)}{sub(x,\lambda)} \qquad (10)$$

Now, based on the brightness enhancement ratio t, an attenuation F(t) of the texture component is set to generate an output image J according to an equation (11).

$$J(x, \lambda) = \begin{cases} B_2 + t(x, \lambda) \cdot \text{sign}(\text{sub}(x, \lambda)) \cdot & \text{if } |\text{sub}(x, \lambda)| > F(t(x, \lambda)) \\ (|\text{sub}(x, \lambda)| - F(t(x, \lambda))) & \\ B_2(t(x, \lambda)) & \text{else} \end{cases} \quad (11)$$

Here, the attenuation F(t) of the texture component is set such that, by using the brightness enhancement ratio t and a noise variance σ in the input image, the attenuation F(t) becomes larger as the brightness enhancement ratio t becomes larger, i.e., the attenuation F(t) becomes smaller as the brightness enhancement ratio t becomes smaller. An example of the calculation method for calculating the attenuation F(t) is illustrated below. In the following equation, k is a value manually set in advance.

$$F(t(x, \lambda)) = \begin{cases} \sigma(\lambda) + k \cdot (t(x, \lambda) - 1.0) & \text{if } t(x, \lambda) \geq 1.0 \\ \sigma(\lambda) & \text{else} \end{cases}$$

or $$F(t(x, \lambda)) = \begin{cases} k \cdot \sigma(\lambda) \cdot (t(x, \lambda) - 1.0) & \text{if } t(x, \lambda) \geq 1.0 \\ \sigma(\lambda) & \text{else} \end{cases}$$

According to an aspect of the second exemplary embodiment, the mist/fog correction processing for removing mist/fog from an image can suppress a drastic fluctuation on a low brightness side of the image to prevent a black defect. According to another aspect of the second exemplary embodiment, the mist/fog correction processing can prevent degradation of a contrast. Further, execution of the noise suppression processing based on the correction factor enables to prevent a noise within the image from being sharpened.

Still further, the image processing apparatus having a noise removal function together with a separation processing function for separating a texture and a region within the image from each other, in the image analysis, the separation processing function being relatively costly, the performance of the image processing apparatus can be enhanced as well as the calculation cost thereof can be saved in comparison with a case where each function is performed simply in parallel.

A third exemplary embodiment of the present invention is described below.

Figure 3:
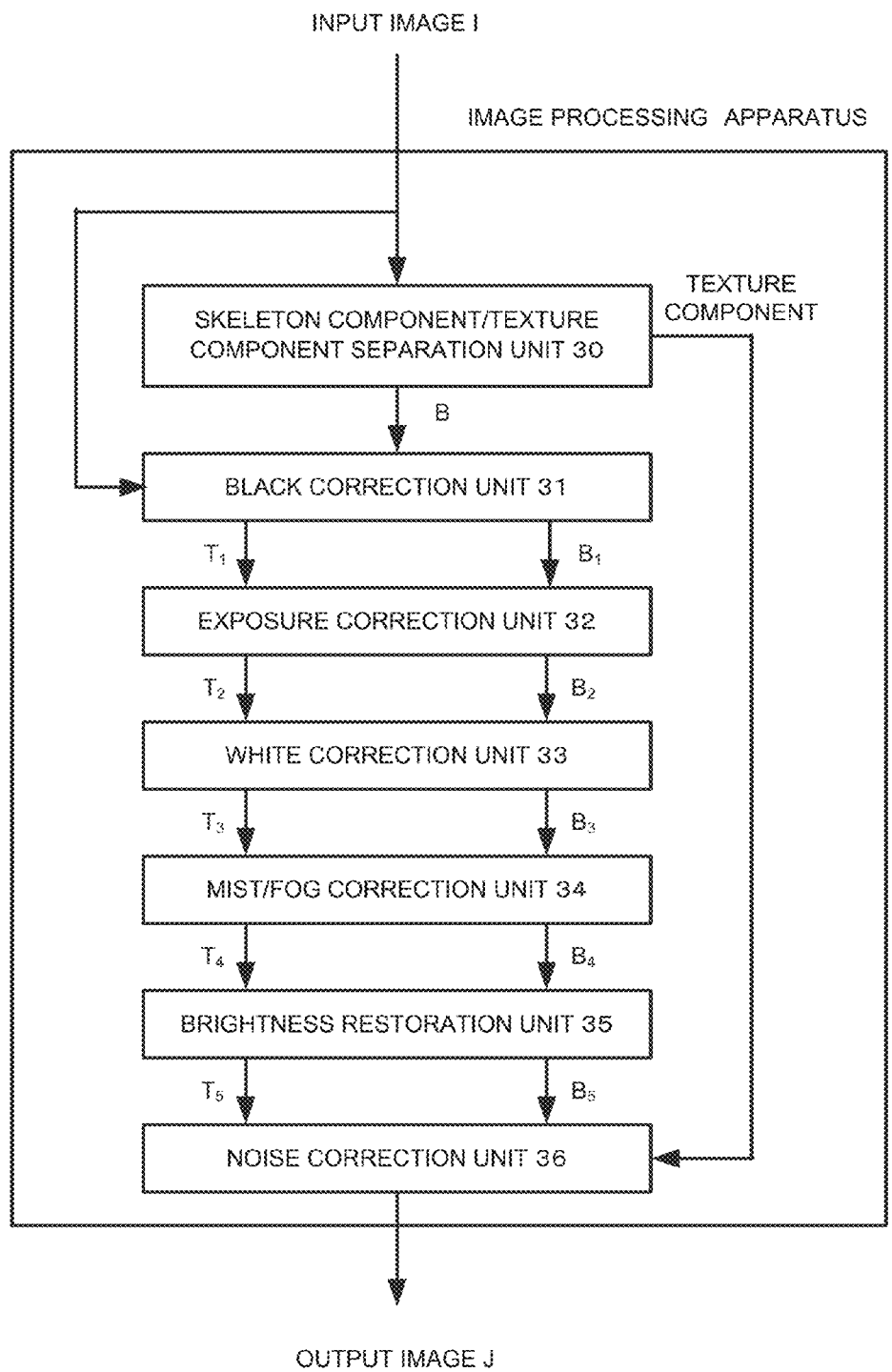
FIG. 3 is a block diagram of an image processing apparatus according to a third exemplary embodiment.

FIG. 3 is a block diagram illustrating an image processing apparatus according to the third exemplary embodiment.

The image processing apparatus according to the third exemplary embodiment is configured to include, as illustrated in FIG. 3, a skeleton component/texture component separation unit 30, a black correction unit 31, an exposure correction unit 32, a white correction unit 33, a mist/fog correction unit 34, a brightness restoration unit 35, and a noise suppression unit 36.

The skeleton component/texture component separation unit 30 is configured to perform a skeleton component/texture component separation with respect to a source image (i.e., an input image), wherein the source image is separated into a skeleton component expressing color and brightness of each region and a texture component and a noise component (hereinafter collectively referred to as texture component) as a residual component of the source image. Further specifically, the skeleton component/texture component separation unit 30 is configured to perform a skeleton component/texture component separation using a total variation norm minimization wherein the brightness and color information can be extracted for each region. The total variation norm minimization is a technique for removing a vibration component within an image as a texture component. According to the total variation norm minimization, a skeleton component B of an image is extracted from a source image (i.e., an input image) I by solving a minimization problem expressed by the equation (5). A combination with the multi-resolution analysis enables not only removal of a fine vibration component but also removal of a (low-frequency) vibration having a cycle to some extent.

The black correction unit 31 is configured to estimate a black reference level bl within the image by a histogram analysis with respect to the source image (hereinafter referred to as input image) I and the skeleton component B to perform a correction by using a compensation formula expressed by an equation (12). In the equation (12), $T_1$ indicates an input image after being subjected to the black correction processing, $B_1$ indicates a skeleton component after being subjected to the black correction processing, x indicates a location of a pixel, and λ indicates a color channel.

$$T_1(x, \lambda) = \begin{cases} 0 & \text{if } I(x, \lambda) < bl \\ \frac{1}{1 - bl}(I(x, \lambda) - bl) & \text{else} \end{cases} \quad (12)$$

$$B_1(x, \lambda) = \begin{cases} 0 & \text{if } B(x, \lambda) < bl \\ \frac{1}{1 - bl}(B(x, \lambda) - bl) & \text{else} \end{cases}$$

Figure 4:
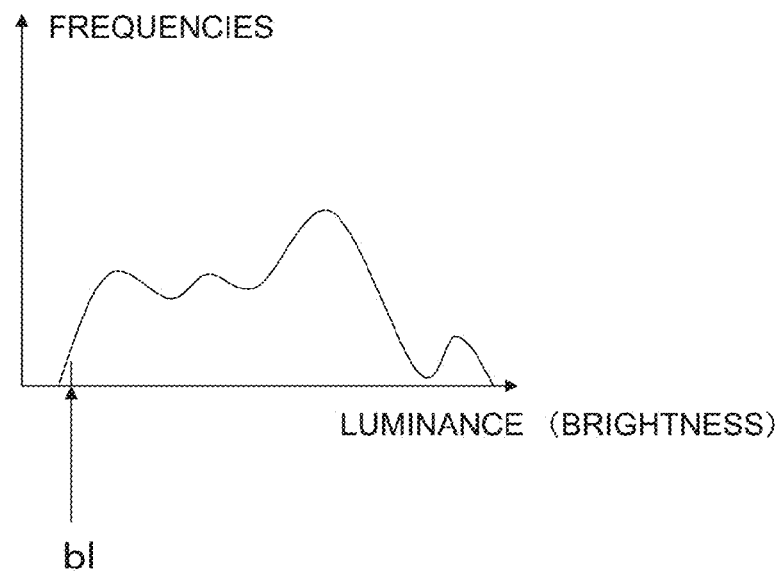
FIG. 4 is a graph illustrating a reference level.

The above correction is required since an image with mist/fog superimposed thereon appears whitish in its entirety and the black reference level is relatively high throughout the image. Therefore, it is preferred to detect the black reference level of the entire image and remove a range including no information to thereby widen a dynamic range as a whole. When estimating the black reference level bl, for example, a histogram of luminance (i.e., brightness) as illustrated in FIG. 4 is made for the entire image. Then, frequencies are added from a bottom side and luminance (i.e., brightness) reaching preliminary designated cumulative frequency is set to the black reference level bl. Incidentally, the luminance (i.e., the brightness) reaching the preliminary designated cumulative frequency may be multiplied by a predetermined ratio or may be provided with a limiter.

The exposure correction unit 32 is configured to calculate brightness throughout an image by a histogram analysis, calculate a gamma correction parameter γ for changing brightness throughout the image to target brightness, and execute gamma correction processing by using an equation (13) with respect to the black-corrected input image $T_1$ and the black-corrected skeleton component $B_1$ for the purpose of adjusting brightness throughout the image. Here, $T_2$ indicates an input image after being subjected to the exposure correction processing and $B_2$ indicates a skeleton component after being subjected to the exposure correction processing.

$$T_2(x, \lambda) = (T_1(x, \lambda))^\gamma$$

$$B_2(x, \lambda) = (B_1(x, \lambda))^\gamma \quad (13)$$

The gamma correction parameter γ can be calculated, for example, by:

$$\Gamma = \ln(q)/\ln(p)$$

where an average value or a medium value of the luminance (i.e., the brightness) throughout the image is p and target brightness is q. Here, ln is a logarithmic function.

The white correction unit 33 is configured to obtain environmental light $A(\lambda)$ by the image analysis and normalize a color of the environmental light by using an equation (14) with respect to the exposure-corrected input image $T_2$ and the exposure-corrected skeleton component $B_2$. Here, $T_3$ indicates the white-corrected input image and $B_3$ indicates the white-corrected skeleton component.

$$T_3(x, \lambda) = \frac{\max_{\forall\lambda} A(\lambda)}{A(\lambda)} T_2(x, \lambda) \qquad (14)$$

$$B_3(x, \lambda) = \frac{\max_{\forall\lambda} A(\lambda)}{A(\lambda)} B_2(x, \lambda)$$

In the input image, a white balance is not always perfect but a contrast of colors throughout the image is widened due to the below mentioned mist/fog correction processing, which may invite a sharpened lost white balance. Consequently, it is desirable to preliminary normalize a color of the environmental light.

Figure 5:
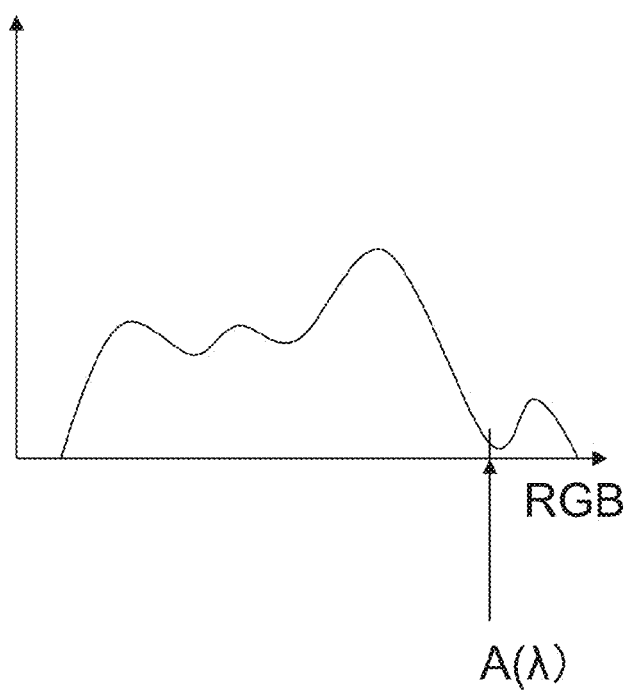
FIG. 5 is a graph illustrating environmental light.

The environmental light $A(\lambda)$ may be calculated such that, for example, as illustrated in FIG. 5, a histogram of each color channel of the image is made and frequencies are added from an upper side of the histogram to set a value reaching the preliminary designated cumulative frequency to the environmental light $A(\lambda)$. Incidentally, the value reaching the preliminary designated cumulative frequency, i.e., $A(\lambda)$, may be multiplied by a predetermined ratio or may be provided with a limiter.

The mist/fog correction unit 34 is configured to perform a gamma correction, while changing a gamma value for each pixel, from color information of each pixel of a corrected input image $T_3$ obtained with reference to the skeleton component $B_3$. More specifically, with respect to a pixel at a location x, a value obtained such that a minimum value of each color channel of the skeleton component $B_3$ is multiplied by the ratio r is set to an amount of superimposition haze ($0<\text{haze}<1$) of mist/fog of the image (see, an equation (15)). Then, a gamma value $\gamma_h$ for correction is set by using an equation (16) and the correction is performed by using an equation (17) based on the gamma value $\gamma_h$. Here, $T_4$ indicates a mist/fog-removed input image and $\lambda$ indicates a color channel.

$$\text{haze} = r \cdot \min_{\forall\lambda}(B_3(x, \lambda)) \qquad (15)$$

$$\gamma_h = \frac{1.0}{1.0 - \text{haze}} \qquad (16)$$

$$T_4(x, \lambda) = (T_3(x, \lambda))^{\gamma_h} \qquad (17)$$

Similarly, with respect to a skeleton component $B_3(x, \lambda)$, mist/fog correction processing is also applied to obtain $B_4(x, \lambda)$.

$$\text{haze} = r \cdot \min_{\forall\lambda}(B_3(x, \lambda)) \qquad (15)'$$

$$\gamma_h = \frac{1.0}{1.0 - \text{haze}} \qquad (16)'$$

$$B_4(x, \lambda) = (B_3(x, \lambda))^{\gamma_h} \qquad (17)'$$

Here, a reason why the gamma correction is used in the mist/fog correction processing is that, in the gamma correction (in a case of $\gamma$ value>1.0), a correction factor is relatively high on a high brightness side of the input image and the correction factor is relatively low on a low brightness side of the input image. For example, as the amount of superimposition haze of mist/fog becomes larger, the gamma value $\gamma_h$ becomes larger according to the equations (16) and (16)'. Consequently, according to the equations (17) and (17)', as the amount of superimposition haze of mist/fog becomes larger, correction is performed so as to lower the brightness of the pixel. On the other hand, as the amount of superimposition haze of mist/fog becomes smaller, the gamma value $\gamma_h$ comes closer to 1 and the brightness of the pixel is less corrected.

The ratio r in the equations (15) and (15)' may be changed according to, for example, the brightness lumi surrounding a target pixel. Incidentally, the ratio r has a positive correlation with a value of the brightness lumi (i.e., When the brightness lumi increases, the ratio r becomes higher, whereas, when the brightness lumi decreases, the ratio r becomes lower.).

$$r = \begin{cases} r_{max} & \text{if } lumi > th \\ r_{max} \cdot lumi/th & \text{else} \end{cases}$$

An example of a method for calculating the brightness lumi is shown as follows.

$$\text{lumi}(x) = \max_{\forall\lambda}(B_3(x,\lambda))$$

$$\text{lumi}(x) = (\max_{\forall\lambda}(B_3(x,\lambda)) + \min_{\forall\lambda}(B_3(x,\lambda)))/2$$

The gamma correction is not the only example of the correction method of the mist/fog correction processing. For example, in a case where the amount of superimposition haze is calculated by using the ratio r that is corrected by the brightness lumi, the following correction may be performed.

$$T_4(x, \lambda) = \begin{cases} 0 & \text{if } T_3(x, \lambda) < \text{haze} \\ \frac{1.0}{1.0 - \text{haze}}(T_3(x, \lambda) - \text{haze}) & \text{else} \end{cases}$$

The brightness restoration unit 35 is configured to restore brightness throughout the image whose brightness was lowered with respect to the mist/fog removed input image $T_4$ and the mist/fog removed skeleton component $B_4$. The mist/fog correction unit 34 comes to perform, in order to suppress information loss caused by saturation, correction processing around a saturation point 1.0. As a result, the brightness of the environmental light and the brightness throughout the image tend to be dark. The brightness throughout the image having been lowered is restored by the brightness restoration unit 35. More specifically, the mist/fog correction unit 34 is configured to calculate an index $\gamma_2$ for converting the lowered brightness of the environmental light to target brightness and, by using the index $\gamma_2$, correct the brightness throughout the image according to an equation (18). Here, $T_5$ indicates a brightness-restored input image and $B_5$ indicates a brightness-restored skeleton component.

$$T_5(x,\lambda)=1.0-(1.0-T_4(x,\lambda))^{\gamma_2}$$

$$B_5(x,\lambda)=1.0-(1.0-B_4(x,\lambda))^{\gamma_2} \quad (18)$$

The index $\gamma_2$ can be calculated by using the following equation:

$$\gamma_2=\ln(1.0-q)/\ln(1.0-p)$$

where a value of the mist/fog-corrected environmental light is p and target brightness is q. Incidentally, the value p may be a result of the white correction. Further, the target brightness q may be Max(A ($\lambda$)) upon estimation of white correction.

Further, as seen from the following equation, a region where more correction is provided by the mist/fog correction unit 34 may be heavily restored.

$$T_5{'}(x,\lambda)=\text{ratio}\cdot T_5(x,\lambda)+(1-\text{ratio})\cdot T_4(x,\lambda)$$

Here, the ratio is determined by the amount of superimposition haze according to the following equation.

$$\text{ratio} = \begin{cases} 1.0 & \text{if haze} > th \\ \text{haze}/th & \text{else} \end{cases}$$

The noise suppression unit 36 is configured to suppress a sharpened noise of an image. A local contrast is sharpened in the mist/fog correction processing, so that a noise as well as the texture component of the image is sharpened. The noise suppression unit 36 is configured to suppress the sharpened noise with respect to an input image $T_5$ and a skeleton component $B_5$. More specifically, a brightness enhancement ratio t of the texture and the noise is calculated according to an equation (19) by using the skeleton component $B_5$ that has been subjected to correction processing similar to be provided on the input image.

$$t(x, \lambda) = \frac{T_5(x, \lambda) - B_5(x, \lambda)}{I(x, \lambda) - B(x, \lambda)} = \frac{sub_5(x, \lambda)}{sub(x, \lambda)} \quad (19)$$

Then, based on the brightness enhancement ratio t, an attenuation F(t) of the texture component is set to generate an output image J according to an equation (20).

$$J(x, \lambda) = \begin{cases} B_5 + t(x, \lambda)\cdot\text{sign}(sub(x, \lambda))\cdot & \text{if}|sub(x, \lambda)| > F(t(x, \lambda)) \\ (|sub(x, \lambda)| - F(t(x, \lambda))) & \\ B_5(t(x, \lambda)) & \text{else} \end{cases} \quad (20)$$

Here, the attenuation F(t) of the texture component is set by using the brightness enhancement ratio t and a noise variance $\sigma$ in the input image such that, as the brightness enhancement ratio t becomes larger, the attenuation F(t) becomes larger, i.e., as the brightness enhancement ratio t becomes smaller, the attenuation F(t) becomes smaller. An exemplary equation of a calculation method for calculating the attenuation F(t) is shown below, where k is a value manually set in advance.

$$F(t(x, \lambda)) = \begin{cases} \sigma(\lambda) + k\cdot(t(x, \lambda) - 1.0) & \text{if } t(x, \lambda) \geq 1.0 \\ \sigma(\lambda) & \text{else} \end{cases}$$

or $$F(t(x, \lambda)) = \begin{cases} k\cdot\sigma(\lambda)\cdot(t(x, \lambda) - 1.0) & \text{if } t(x, \lambda) \geq 1.0 \\ \sigma(\lambda) & \text{else} \end{cases}$$

In the present method, the attenuation of the noise can be adaptively set based on the correction factor, so that less noise suppression is provided to a region to which less amount of correction is made in the mist/fog correction processing. Accordingly, an image can be output without an original texture component being deleted.

FIG. 6 illustrates a source image (i.e., an input image) and an output image after being processed by the above described image processing apparatus. As seen from FIG. 6, whitishness and a lowered contrast of the image caused by mist/fog are restored and mist/fog is removed from the image. Also, the noise within the image is suppressed.

A fourth exemplary embodiment of the present invention is described below.

The fourth exemplary embodiment has functions similar to those of the first exemplary embodiment except for the brightness restoration unit 3. An effect of mist/fog correction processing can be produced satisfactory with respect to an image hardly affected by degradation of brightness. The fourth exemplary embodiment is described below.

Figure 7:
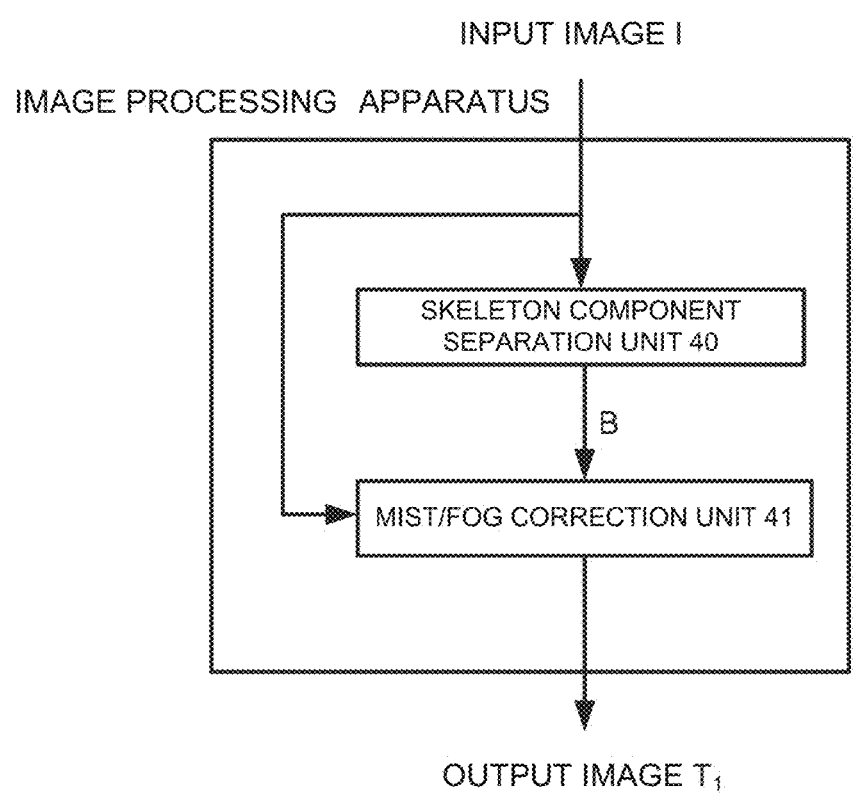
FIG. 7 is a block diagram illustrating an image processing apparatus according to a fourth exemplary embodiment.
Figure 8:
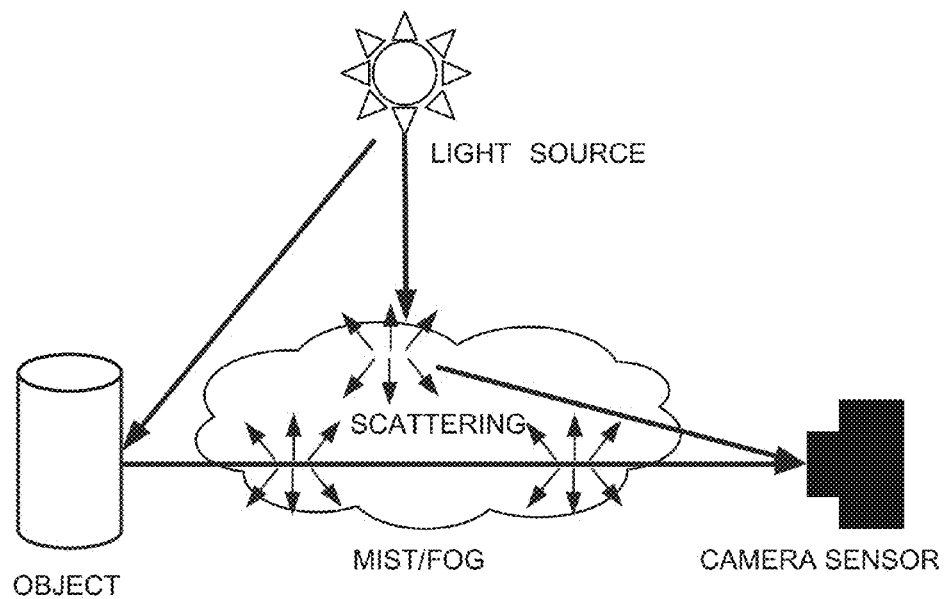
FIG. 8 illustrates a background art.

FIG. 7 is a block diagram illustrating an image processing apparatus according to the fourth exemplary embodiment of the present invention.

The image processing apparatus of the fourth exemplary embodiment is configured to include a skeleton separation unit 40 and a mist/fog correction unit 41.

The skeleton separation unit 40 has function similar to those of the skeleton separation unit 1. That is, the skeleton separation unit 40 is configured to separate a skeleton component illustrating a perspective structure from a source image (i.e., an input image) input to the image processing apparatus. An example of the separation method may include a skeleton component/texture component separation method using a total variation norm minimization wherein the brightness and color information can be extracted for each region. The total variation norm minimization is a technique for removing a vibration component within an image as a texture component or a noise component. In the total variation norm minimization, removal of the texture component or the noise component enables extraction of the skeleton component of the source image (i.e., the input image).

More specifically, by solving a minimization problem expressed by the equation (5), a skeleton component B of an image is extracted from a source image (hereinafter referred to as input image) I. In combination with a multi-resolution analysis, not only removal of a fine vibration component but also removal of a (low-frequency) vibration having a wide cycle to some extent can be achieved.

The mist/fog correction unit 41 has functions similar to those of the mist/fog correction unit 2. That is, the mist/fog correction unit 41 is configured to calculate, based on color information in each color channel of the skeleton component, a correction factor that lowers brightness of a pixel as the pixel becomes brighter and correct, based on the correction factor, brightness of each pixel of an input image to remove mist/fog. In a correction of the brightness, execution of a local gamma correction suppresses a drastic fluctuation on a low brightness side of the image, thereby preventing a black defect. More specifically, the mist/fog correction unit 41 is configured to calculate, from a minimum value of color channel of each pixel of the skeleton component, an amount of superimposition of mist/fog of the pixel and calculate, from the amount of superimposition of mist/fog, a gamma value (i.e., a correction factor) for correction of a pixel to perform a gamma correction by using thus calculated gamma value with respect to the each pixel. Incidentally, the gamma value (i.e., the correction factor) may be determined not only with color information in each color channel but also additionally with brightness surrounding a target pixel.

More specifically, the mist/fog correction unit 41 performs the gamma correction, with reference to the skeleton component B, while changing the gamma value for each pixel based on the color information of each pixel of an input image I. Further specifically, with respect to a pixel at a location x, a value obtained such that a minimum value of each color channel of the skeleton component B is multiplied by a ratio r is set to an amount of superimposition haze (0<haze<1) of mist/fog of the image (see, the equation (6)). Then, a gamma value $\gamma_h$ is set for the purpose of a correction by using the equation (7) and correction is performed based on the gamma value $\gamma_h$ according to the equation (8).

According to an aspect of the fourth exemplary embodiment, high quality mist/fog correction processing can be performed even in a case where a pixel whose value is 0 in either one of a red (R) channel, a green (G) channel, and a blue (B) channel does not exist around the target pixel and in a case where a different value between color bands is small.

In the above described exemplary embodiments, each unit is constituted by hardware. However, a program for causing an information processing apparatus (e.g., a CPU) to perform the above described processing can be used instead of the hardware.

One part or an entirety of the above exemplary embodiment can be expressed as the following notes, but the invention is not limited thereto.

(Supplementary note 1) An image processing apparatus comprising:

a skeleton component separation unit configured to separate a skeleton component illustrating a perspective structure from a source image; and a mist/fog correction unit configured to calculate, based on color information in each color channel of the skeleton component, a correction factor and correct, based on the correction factor, brightness of each pixel of the source image.

(Supplementary note 2) The image processing apparatus according to Supplementary note 1, wherein the mist/fog correction unit is configured to calculate, based on color information in each color channel of the skeleton component, a correction factor that lowers brightness of a pixel as the pixel is brighter and correct, based on the correction factor, brightness of each pixel of the source image.

(Supplementary note 3) The image processing apparatus according to Supplementary note 1 or Supplementary note 2, wherein the mist/fog correction unit is configured to calculate, from a minimum value of color channel of each pixel of the skeleton component, an amount of superimposition of mist/fog of the each pixel and calculate a gamma value for correction of the each pixel from the amount of superimposition of mist/fog to perform a gamma correction by using the gamma value with respect to the each pixel.

(Supplementary note 4) The image processing apparatus according to any one of Supplementary notes 1 through 3, further comprising:

a brightness restoration unit configured to restore brightness of the brightness-corrected source image to brightness of environmental light as target brightness.

(Supplementary note 5) The image processing apparatus according to Supplementary note 4, wherein the brightness restoration unit is configured to restore brightness more for a pixel whose brightness has been corrected more by the mist/fog correction unit.

(Supplementary note 6) The image processing apparatus according to Supplementary note 4 or Supplementary note 5:

wherein the skeleton component separation unit is configured to separate a source image into a skeleton component illustrating a perspective structure and a texture component as a residual component of the source image;

wherein the mist/fog correction unit is configured to calculate, based on color information in each color channel of the skeleton component, a correction factor that lowers brightness of a pixel as the pixel is brighter and correct, based on the correction factor, brightness of each pixel of the source image and each pixel of the skeleton component;

wherein the brightness restoration unit is configured to restore brightness of the brightness-corrected source image and the brightness-corrected skeleton component to brightness of environmental light as target brightness; and wherein the image processing apparatus further comprises a noise suppression unit configured to suppress a noise of the texture component based on the brightness-restored source image, the brightness-restored skeleton component, and the texture component and generate an output image based on the noise-suppressed texture component and the brightness-restored skeleton component.

(Supplementary note 7) The image processing apparatus according to Supplementary note 6, wherein the noise suppression unit is configured to calculate a brightness enhancement ratio based on a ratio between the source image and the skeleton component and the brightness-restored source image and the brightness-restored skeleton component, attenuate the texture component based on the brightness enhancement ratio, and suppress, based on the attenuated texture component, a noise of the brightness-restored skeleton component.

(Supplementary note 8) The image processing apparatus according to any one of Supplementary notes 1 through 7, further comprising:

a black correction unit configured to detect a black reference level throughout an image and remove a range with no information to enlarge a dynamic range with respect to the source image and the skeleton component;

an exposure correction unit configured to calculate brightness throughout the image of the black-corrected source image and the black-corrected skeleton component and correct the brightness throughout the image to target brightness; and a white correction unit configured to obtain environmental light of the exposure-corrected source image and the exposure-corrected skeleton component and normalize a color of the environmental light;

wherein the mist/fog correction unit is configured to make a correction by using the source image and the skeleton component each after being processed by the black correction unit, the exposure correction unit, and the white correction unit.

(Supplementary note 9) The image processing apparatus according to any one of Supplementary notes 1 through 7, wherein the mist/fog correction unit is configured to correct brightness of each pixel of the source image by using a correction factor obtained from each pixel of the skeleton component.

(Supplementary note 10) An image processing method comprising:

separation processing configured to separate a skeleton component illustrating a perspective structure from a source image; and mist/fog correction processing configured to calculate a correction factor based on color information in each color channel of the skeleton component and correct, based on the correction factor, brightness of each pixel of the source image.

(Supplementary note 11) The image processing method according to Supplementary note 10, wherein the mist/fog correction processing is configured to calculate, based on color information in each color channel of the skeleton component, a correction factor that lowers brightness of a pixel as the pixel is brighter and correct, based on the correction factor, brightness of each pixel of the source image.

(Supplementary note 12) The image processing method according to Supplementary note 10 or Supplementary note 11, wherein the mist/fog removal unit is configured to calculate, from a minimum value of color channel of each pixel of the skeleton component, an amount of superimposition of mist/fog of the each pixel and calculate a gamma value for correction of the each pixel from the amount of superimposition of mist/fog to perform a gamma correction by using the gamma value with respect to the each pixel.

(Supplementary note 13) The image processing method according to any one of Supplementary notes 10 through 12, further comprising a brightness restoration unit configured to restore brightness of the brightness-corrected source image to brightness of environmental light as target brightness.

(Supplementary note 14) The image processing method according to Supplementary note 13, wherein the brightness restoration processing is configured to restore brightness more for a pixel whose brightness has been corrected more by the mist/fog correction unit.

(Supplementary note 15) The image processing method according to Supplementary note 13 or Supplementary note 14:

wherein the separation processing is configured to separate a source image into a skeleton component illustrating a perspective structure and a texture component as a residual component of the source image;

wherein the mist/fog correction processing is configured to calculate, based on color information in each color channel of the skeleton component, a correction factor that lowers brightness of a pixel as the pixel is brighter and correct, based on the correction factor, brightness of each pixel of the source image and each pixel of the skeleton component;

wherein the brightness restoration processing is configured to restore brightness of the brightness-corrected source image and the brightness-corrected skeleton component to brightness of environmental light as target brightness; and wherein the image processing method further comprises a noise suppression processing configured to suppress a noise of the texture component based on the brightness-restored source image and the brightness-restored skeleton component and the texture component and generate an output image from the noise-suppressed texture component and the brightness-restored skeleton component.

(Supplementary note 16) The image processing method according to Supplementary note 15, wherein the noise suppression processing is configured to calculate a brightness enhancement ratio based on a ratio between the source image and the skeleton component and the brightness-restored source image and the brightness-restored skeleton component, attenuate the texture component based on the brightness enhancement ratio, and suppress, based on the attenuated texture component, a noise of the brightness-restored skeleton component.

(Supplementary note 17) The image processing method according to any one of Supplementary notes 10 through 16, further comprising:

black correction processing configured to detect a black reference level throughout the image and remove a range with no information to enlarge a dynamic range with respect to the source image and the skeleton component;

exposure correction processing configured to calculate brightness throughout the image of the black-corrected source image and the black-corrected skeleton component to correct brightness throughout the image to target brightness; and white correction processing configured to obtain environmental light of the exposure-corrected source image and the exposure-corrected skeleton component to normalize a color of the environmental light;

wherein the mist/fog correction processing is configured to perform correction by using the source image and the skeleton component each after being subjected to the black correction processing, the exposure correction processing, and the white correction processing.

(Supplementary note 18) The image processing method according to any one of Supplementary notes 9 through 17, wherein the mist/fog correction processing is configured to correct brightness of each pixel of the source image by using a correction factor obtained from each pixel of the skeleton component.

(Supplementary note 19) A program for causing a computer to perform:

separation processing configured to separate a skeleton component illustrating a perspective structure from a source image; and mist/fog correction processing configured to calculate a correction factor based on color information in each color channel of the skeleton component and correct, based on the correction factor, brightness of each pixel of the source image.

(Supplementary note 20) The program according to Supplementary note 19, wherein mist/fog correction processing is configured to calculate, based on color information in each color channel of the skeleton component, a correction factor that lowers brightness of a pixel as the pixel is brighter and correct, based on the correction factor, brightness of each pixel of the source image.

(Supplementary note 21) The program according to Supplementary note 19 or Supplementary note 20, wherein the mist/fog correction processing is configured to calculate, from a minimum value of color channel of each pixel of the skeleton component, an amount of superimposition of mist/fog of the each pixel and calculate, from the amount of superimposition of the mist/fog, a gamma value for correction of the each pixel to perform a gamma correction by using the gamma value with respect to the each pixel.

(Supplementary note 22) The program according to any one of Supplementary notes 19 through 21 for causing a computer to perform brightness restoration processing wherein the brightness of the brightness-corrected source image is corrected to brightness of environmental light as target brightness.

(Supplementary note 23) The program according to Supplementary note 22, wherein the brightness restoration processing is configured to restore the brightness more for a pixel whose brightness has been corrected more by the mist/fog correction unit.

(Supplementary note 24) The program according to Supplementary note 22 or Supplementary note 23:

wherein the separation processing is configured to separate a source image into a skeleton component illustrating a perspective structure and a texture component as a residual component of the source image;

wherein the mist/fog correction processing is configured to calculate, based on color information in each color channel of the skeleton component, a correction factor that lowers brightness of a pixel as the pixel is brighter and correct, based on the correction factor, brightness of each pixel of the source image and each pixel of the skeleton component;

wherein the brightness restoration processing is configured to restore brightness of the brightness-corrected source image and the brightness-corrected skeleton component to brightness of environmental light as target brightness; and wherein the program causes a computer to perform noise suppression processing configured to suppress a noise of the texture component based on the brightness-restored source image, the brightness-restored skeleton component, and the texture component and generate an output image from the noise-suppressed texture component and the brightness-restored skeleton component.

(Supplementary note 25) The program according to Supplementary note 24, wherein the noise suppression processing is configured to calculate a brightness enhancement ratio based on a ratio between the source image and the skeleton component and the brightness-restored source image and the brightness-restored skeleton component and attenuate, based on the brightness enhancement ratio, the texture component to suppress a noise of the brightness-restored skeleton component based on the attenuated texture component.

(Supplementary note 26) The program according to any one of Supplementary notes 19 through 25 for causing a computer to perform:

black correction processing configured to detect a black reference level throughout the image and remove a range with no information to enlarge a dynamic range with respect to the source image and the skeleton component;

exposure correction processing configured to calculate brightness throughout the image of the black-corrected source image and the black-corrected skeleton component to correct brightness throughout the image to target brightness; and white correction processing configured to obtain environmental light of the exposure-corrected source image and the exposure-corrected skeleton component to normalize a color of the environmental light;

wherein the mist/fog correction processing is configured to perform correction by using the source image and the skeleton component each after being subjected to the black correction processing, the exposure correction processing, and the white correction processing.

(Supplementary note 27) The program according to any one of Supplementary notes 19 through 26, wherein the mist/fog correction processing is configured to correct brightness of each pixel of the source image by using a correction factor obtained from each pixel of the skeleton component.

While the present invention has been described with reference to exemplary embodiments, it is to be understood that the invention is not limited to the disclosed exemplary embodiments. The present invention can be carried out so as not to depart from the spirit and scope of the invention.

This application is based upon and claims the benefit of priority from Japanese patent application No. 2012-249458, filed on Nov. 13, 2012, the disclosure of which is incorporated herein in its entirety by reference.

REFERENCE SIGNS LIST 1 skeleton component separation unit
2 mist/fog correction unit
3 brightness restoration unit
11 skeleton component/texture component separation unit
12 mist/fog correction unit
13 brightness restoration unit
14 noise correction unit
30 skeleton component/texture component separation unit
31 black correction unit
32 exposure correction unit
33 white correction unit
34 mist/fog correction unit
35 brightness restoration unit
36 noise correction unit
40 skeleton component separation unit
41 mist/fog correction unit

What is claimed is:

1. An image processing apparatus comprising:
hardware, including a processor and memory;
a skeleton component separation unit implemented by the hardware and configured to separate a skeleton component having a plurality of pixels and illustrating a perspective structure from a source image; and
a mist/fog correction unit implemented by the hardware and configured to calculate, based on color information in each color channel of the skeleton component, a correction factor and correct, based on the correction factor, brightness of each pixel of a plurality of pixels of the source image,
wherein the mist/fog correction unit is configured to calculate, from a minimum value of color channel of each pixel of the skeleton component, an amount of superimposition of mist/fog of the each pixel of the source image and calculate a gamma value for correction of the each pixel of the source image from the amount of superimposition of mist/fog to perform a gamma correction by using the gamma value with respect to the each pixel of the source image.

2. The image processing apparatus according to claim 1, further comprising:
a brightness restoration unit implemented at least by the hardware and configured to restore brightness of the brightness-corrected source image to brightness of environmental light as target brightness.

3. The image processing apparatus according to claim 2, wherein the brightness restoration unit is configured to restore brightness more for a pixel whose brightness has been corrected more by the mist/fog correction unit.

4. The image processing apparatus according to claim 2:
wherein the skeleton component separation unit is configured to separate a source image into the skeleton component and a texture component as a residual component of the source image;
wherein the mist/fog correction unit is configured to calculate, based on color information in each color channel of the skeleton component, the correction factor that lowers brightness of a pixel and correct, based on the correction factor, brightness of each pixel of the source image and each pixel of the skeleton component;
wherein the brightness restoration unit is configured to restore brightness of the brightness-corrected source image and the brightness-corrected skeleton component to brightness of environmental light as the target brightness; and
wherein the image processing apparatus further comprises a noise suppression unit configured to suppress a noise of the texture component based on the brightness-restored source image, the brightness-restored skeleton component, and the texture component and generate an output image based on the noise-suppressed texture component and the brightness-restored skeleton component.

5. The image processing apparatus according to claim 4, wherein the noise suppression unit is configured to calculate a brightness enhancement ratio based on a ratio between the source image and the skeleton component and the brightness-restored source image and the brightness-restored skeleton component, attenuate the texture component based on the brightness enhancement ratio, and suppress, based on the attenuated texture component, a noise of the brightness-restored skeleton component.

6. The image processing apparatus according to claim 1, further comprising:
a black correction unit implemented at least by the hardware and configured to detect a black reference level throughout the image and remove a range with no information to enlarge a dynamic range with respect to the source image and the skeleton component;
an exposure correction unit implemented at least by the hardware and configured to calculate brightness throughout the image of the black-corrected source image and the black-corrected skeleton component and correct the brightness throughout the image to target brightness; and
a white correction unit implemented at least by the hardware and configured to obtain environmental light of the exposure-corrected source image and the exposure-corrected skeleton component and normalize a color of the environmental light;
wherein the mist/fog correction unit is configured to make a correction by using the source image and the skeleton component each after being processed by the black correction unit, the exposure correction unit, and the white correction unit.

7. The image processing apparatus according to claim 1, wherein the mist/fog correction unit is configured to correct brightness of each pixel of the source image by using the correction factor obtained from each pixel of the skeleton component.

8. An image processing method comprising:
separation processing to separate a skeleton component having a plurality of pixels and illustrating a perspective structure from a source image; and
mist/fog correction processing to calculate a correction factor based on color information in each color channel of the skeleton component and correct, based on the correction factor, brightness of each pixel of a plurality of pixels of the source image,
wherein the mist/fog correction processing calculates, from a minimum value of color channel of each pixel of the skeleton component, an amount of superimposition of mist/fog of the each pixel of the source image and calculates a gamma value for correction of the each pixel of the source image from the amount of superimposition of mist/fog to perform a gamma correction by using the gamma value with respect to the each pixel of the source image.

9. The image processing method according to claim 8, further comprising brightness restoration unit processing to restore brightness of the brightness-corrected source image to brightness of environmental light as target brightness.

10. The image processing method according to claim 9, wherein the brightness restoration processing is configured to restore brightness more for a pixel whose brightness has been corrected more by the mist/fog correction unit.

11. The image processing method according to claim 9:
wherein the separation processing is configured to separate a source image into the skeleton component and a texture component as a residual component of the source image;
wherein the mist/fog correction processing is configured to calculate, based on color information in each color channel of the skeleton component, the correction factor that lowers brightness of a pixel and correct, based on the correction factor, brightness of each pixel of the source image and each pixel of the skeleton component;
wherein the brightness restoration processing is configured to restore brightness of the brightness-corrected source image and the brightness-corrected skeleton component to brightness of environmental light as the target brightness; and
wherein the image processing method further comprises noise suppression processing configured to suppress a noise of the texture component based on the brightness-restored source image and the brightness-restored skeleton component and the texture component and generate an output image from the noise-suppressed texture component and the brightness-restored skeleton component.

12. The image processing method according to claim 11, wherein the noise suppression processing is configured to calculate a brightness enhancement ratio based on a ratio between the source image and the skeleton component and the brightness-restored source image and the brightness-restored skeleton component, attenuate the texture component based on the brightness enhancement ratio, and suppress, based on the attenuated texture component, a noise of the brightness-restored skeleton component.

13. The image processing method according to claim 8, further comprising:
black correction processing configured to detect a black reference level throughout the source image and remove a range with no information to enlarge a dynamic range with respect to the source image and the skeleton component;
exposure correction processing configured to calculate brightness throughout the image of the black-corrected source image and the black-corrected skeleton component to correct brightness throughout the image to target brightness; and
white correction processing configured to obtain environmental light of the exposure-corrected source image and the exposure-corrected skeleton component to normalize a color of the environmental light;
wherein the mist/fog correction processing is configured to perform correction by using the source image and the skeleton component each after being subjected to the black correction processing, the exposure correction processing, and the white correction processing.

14. The image processing method according to claim 8, wherein the mist/fog correction processing is configured to correct brightness of each pixel of the source image by using the correction factor obtained from each pixel of the skeleton component.

15. A non-transitory computer readable storage medium storing a program for causing a computer to perform:
- separation processing to separate a skeleton component having a plurality of pixels and illustrating a perspective structure from a source image; and
- mist/fog correction processing to calculate a correction factor based on color information in each color channel of the skeleton component and correct, based on the correction factor, brightness of each pixel of a plurality of pixels of the source image,
- wherein the mist/fog correction processing calculates, from a minimum value of color channel of each pixel of the skeleton component, an amount of superimposition of mist/fog of the each pixel of the source image and calculates a gamma value for correction the each pixel of the source image from the amount of superimposition of mist/fog to perform a gamma correction by using the gamma value with respect to the each pixel of the source image.

* * * * *